March 18, 1969 J. G. ATWOOD ET AL 3,433,959
MICROPHONE
Filed July 25, 1966
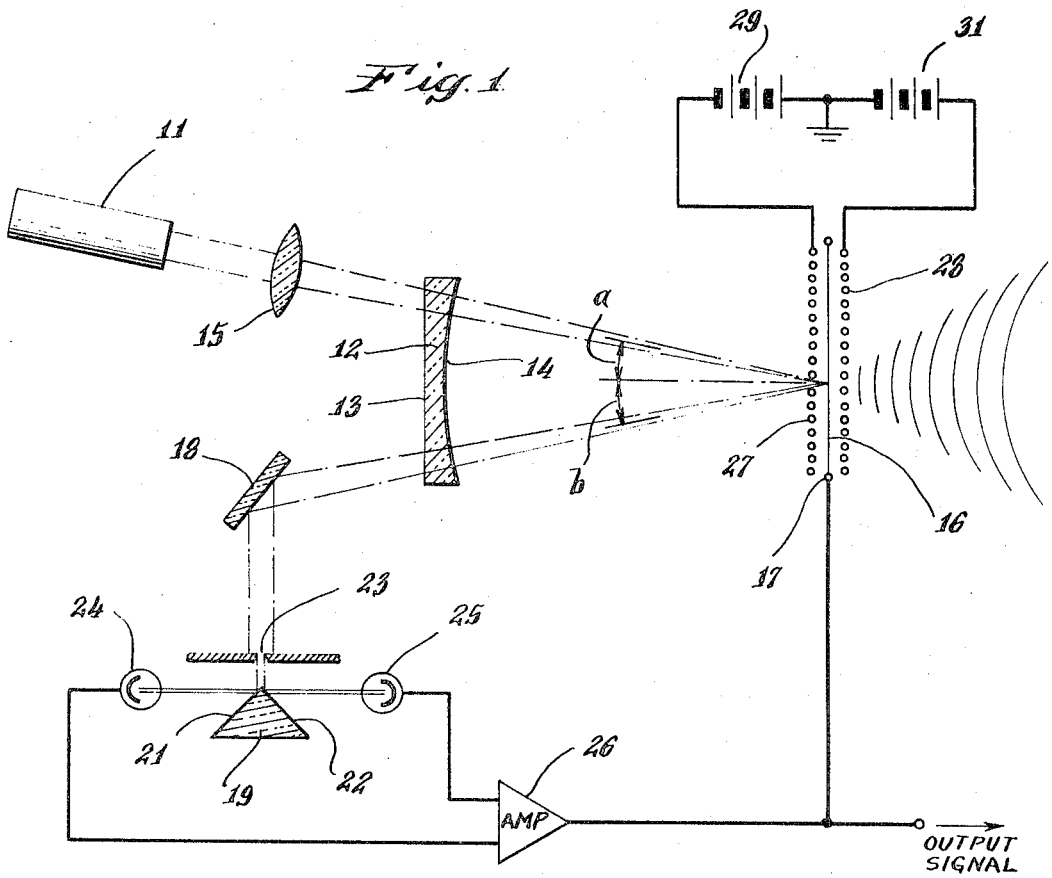
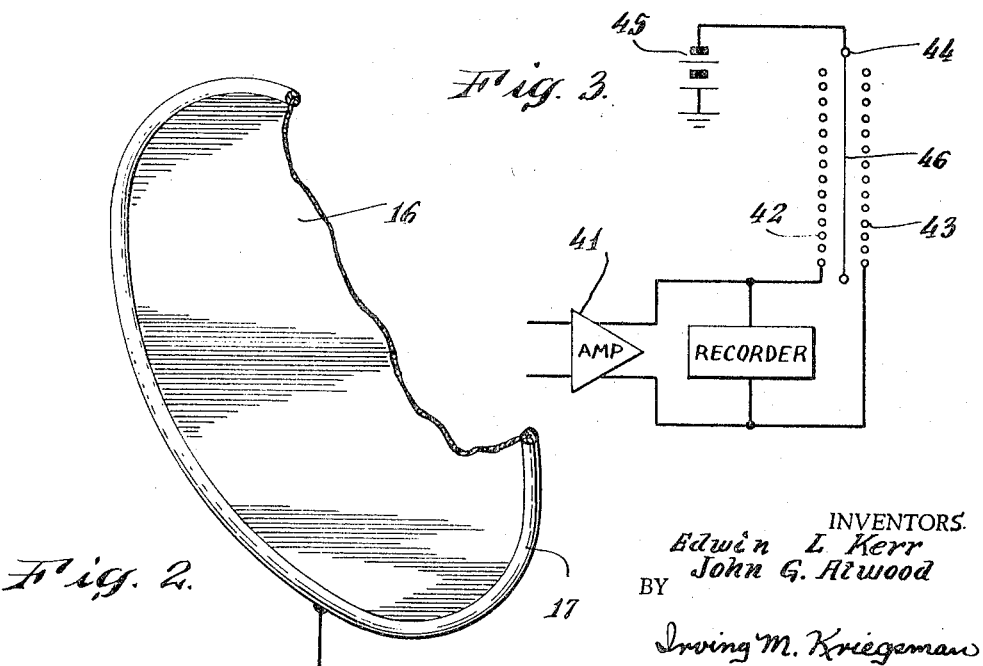
INVENTORS.
Edwin L Kerr
John G. Atwood
BY
Irving M. Kriegsman
ATTORNEY.

United States Patent Office 3,433,959
Patented Mar. 18, 1969

3,433,959
MICROPHONE
John G. Atwood, West Redding, and Edwin L. Kerr, Ridgefield, Conn., assignors to The Perkin-Elmer Corporation, Norwalk, Conn., a corporation of New York
Filed July 25, 1966, Ser. No. 567,500
U.S. Cl. 250—199                11 Claims
Int. Cl. H04b 9/00

ABSTRACT OF THE DISCLOSURE

A microphone in which the diaphragm is a collodion membrane and forms one of the end mirrors of an optical resonant cavity. The other end mirror is partly transmissive. A beam of light from a laser enters the cavity, is subjected to multiple reflections and emerges as a beam of light containing a pattern of interference fringes. Movement of one of these interference fringes caused by a movement of the diaphragm is detected electro-optically and converted into electrical signals from which the direction and magnitude of the movement can be determined. These signals are also used to restore the diaphragm to its original position. The microphone is sensitive to Brownian noise in the ultrasonic frequency range.

---

The present invention relates to an apparatus for converting acoustical signals to electrical signals. More particularly, the present invention relates to a microphone capable of sensing low amplitude high frequency acoustical signals and converting the same into electrical energy.

Microphones, per se, are well known devices. Generally speaking, the sensitivity of a microphone is determined by the amplitude and range of frequencies over which it will respond.

The term "Brownian noise" has recently come into use to describe sound of extremely small magnitude. By definition "Brownian noise" is the sound caused by pressure fluctuations in a gas due to thermal agitation of the gas molecules. It is very small in magnitude. For instance, in air at atmospheric pressure and room temperature, Brownian noise amounts to $2 \times 10^{-4}$ dynes/cm.$^2$ (RMS) over the audible range of 20 c.p.s. to 19 kc.p.s. If the bandwidth is increased to 300 kc.p.s., the Brownian noise is $1.25 \times 10^{-2}$ dynes/cm.$^2$.

Hitherto, conventional microphones, such as the capacitor type, have reportedly been able to detect Brownian noise in the audible frequency range. Other microphones are known which will detect sound in the ultrasonic frequency range, but not at the Brownian noise limit.

It has been proposed to provide for a microphone in which the diaphragm would form one leg of a Twyman-Greene or Michaelson interferometer. Movements of the diaphragm would result in a shifting of the interference fringe pattern. Although such an arrangement might conceivably permit detecting relatively small sound waves, it would not have any substantial effect on the frequency range over which it would respond. If the sensing arrangement were to involve measuring the intensity of one fringe, serious problems would arise when that fringe moved a distance greater than the distance between two adjacent fringes. If the sensing arrangement were to involve counting fringes, small changes would not be detected. Thus, such a device would have severe dynamic range restrictions and very questionable accuracy.

Recently, however, the need has been recognized for a microphone capable of sensing acoustical energy in the ultrasonic frequency range at the Brownian noise limit. Such a device has hitherto been unavailable.

A microphone with these characteristics could be used in the field of spectroscopy for analyzing gases by measuring the absorption of a laser beam in the gas. Such a device would also be useful in detecting the high frequency noises emitted by various insects and animals. The military would undoubtedly have use for a device of this type.

It is therefore an object of this invention to provide a new and improved microphone.

It is another object of this invention to provide for a microphone that is sensitive to Brownian noise in the ultrasonic frequency range.

It is still another object of this invention to provide a new and novel diaphragm for use in a microphone that will be sensitive to Brownian noise.

It is yet still another object to provide a new and improved electro-optical arrangement for sensing movements of a microphone diaphragm.

It is another object of this invention to provide a microphone in which interferometry techniques are used to sense movements of its diaphragm.

It is still another object of this invention to provide for an arrangement for increasing the dynamic range of a microphone without decreasing its sensitivity.

It is yet still another object of this invention to provide a microphone in which calibration errors caused by the physical properties of the diaphragm are greatly reduced.

It is another object of this invention to provide for a microphone whose calibration depends on its geometry.

A more complete appreciation of the invention as well as other objects and many attendant advantages thereof will be readily appreciated as the same becomes better understood through reference to the following detailed description, considered in connection with the accompanying drawing in which:

FIGURE 1 is a schematic diagram of one embodiment of the invention;

FIGURE 2 is an enlarged perspective view of the diaphragm portion of the FIGURE 1 embodiment; and FIGURE 3 is a schematic diagram of a portion of a modified version of the invention.

The foregoing and other objects are achieved by means of a new and novel microphone constructed in accordance with this invention.

One feature of the invention involves a new and novel microphone diaphragm constructed so that it will sense Brownian noise in the ultrasonic frequency range. Another feature of the invention involves using multiple reflection interferometry techniques for sensing movements of a microphone diaphragm. Another feature of the invention involves a new arrangement for sensing movements of an interference fringe pattern. Another feature of the invention involves an electrical feedback servo system which limits the movement of a microphone diaphragm while increasing the microphone's dynamic range. Two versions of this latter feature are provided.

Briefly, the microphone includes a diaphragm having a thickness of approximately 1300 A. The diaphragm forms one end of a optically resonant cavity. Multiple reflections of a laser beam within the cavity cause the beam to interfere with itself resulting in the formation of interference fringes. A sensing arrangement measures the intensity of one fringe and translates this intensity into an electrical signal output. The output is fed back into a servo type force balance system to counteract any movement of the diaphragm by restoring it to its original position.

Referring now to the drawings, there is shown a light source 11 for emitting a collimated beam of monochromatic coherent light. Light source 11 may, for example, be a frequency stabilized continuous wave helium neon laser.

Light from the laser 11 is directed toward a beam splitting mirror 12. Beam splitting mirror 12 includes an uncoated flat front surface 13 and a concave rear surface 14 which is coated so as to be partly reflective. It should be noted, however, that front surface 13 need not be flat but could, if desired, be convex.

Laser 11 is positioned with respect to the beam splitting mirror 12 so that the beam of light will be directed through the front surface 13 and emerge from the rear surface 14 approximately normal to its curvature.

A lens 15 is positioned between the laser 11 and the beam splitting mirror 12 so as to concentrate the light beam from the laser 11 and thereby compensate for any divergence of the light beam caused by the concave surface 14.

Spaced apart from the beam splitting mirror 12 and in alignment therewith is a microphone diaphragm member 16. The microphone diaphragm member 16 is essentially a thin film membrane having a thickness of approximately 1000 A. A suitable material that may be used for the thin film membrane is collodian. However, parylene or other similar materials that can be sized down to the above mentioned thickness may also be used. Vacuum deposition or other equivalent means may be employed for growing a thin film of this thickness. A membrane thus formed has about one tenth of the mass of a column of air whose cross-sectional area is the same as that of the membrane and whose length is approximately 1 mm. corresponding to a plane sound wave in air at 300 kc.p.s.

The diaphragm member 16 is mounted on and supported by a circular ring 17 of conductive material.

One surface of the membrane 16 is provided with a metalized light reflective coating approximately 300 A. thick. The metalized coating is also electrically conductive. The combined thickness of the membrane 16 and the coating is thus approximately 1300 A. A diaphragm of this thickness will accordingly respond to Brownian noise well into the ultrasonic frequency range.

The metalized coating may be deposited onto the membrane 16 by vacuum deposition or other equivalent means well known in the art.

The distance from the beam splitter 12 to the membrane 16 is approximately equal to the focal length of the concave surface 14. The membrane 16 is positioned with its reflective surface facing the reflective surface 14 of the beam splitter. The coated surface of the membrane 16 is substantially totally reflective.

Thus, the beam splitter 12 and the membrane 16 form the two ends of an optical resonator or cavity.

Accordingly, a beam of light from the laser 11 will be transmitted through the beam splitting mirror 12, impinge on the coated surface of the membrane or diaphragm 16 and be reflected back toward the beam splitting mirror 12. Part of the beam will emerge from the beam splitting mirror 12 and part of the beam will be reflected back on itself. Multiple reflections of a beam of light in the resonant cavity in this manner will cause interference and the formation of a plurality of sharply defined interference fringes in the outgoing beam.

Any movement of the membrane 16 caused by a sound wave impinging thereon will result in a lateral displacement or shifting of these interference fringes.

So that the outgoing beam will not be directed back towards the laser 11, the laser is preferably positioned a few degrees $a$ off of the axis of the beam splitting mirror 12. Accordingly, the outgoing beam will be on the opposite side of the axis at an equal number of degrees $b$.

The direction of the outgoing beam is further changed by reflecting the beam off of at a 45.° mirror 18.

An electro-optical arrangement is provided for converting a displacement of an interference fringe, preferably the brightest, into an electrical signal whose polarity and magnitude are in accordance with the direction and amount of shift of the fringe.

The electro-optical arrangment includes a beam splitting prism 19 having a pair of reflective surfaces 21 and 22, a slit 23, a pair of photodetectors 24 and 25 and a differential amplifier 26.

The beam splitting prism 19 is positioned so that its apex will divide one of the interference fringes into two equal beam parts. The slit 23 is positioned between the 45° reflector 18 and the beam splitting prism 19 and in alignment with the selected interference fringe so as to prevent stray light and/or other interference fringes from reaching the prism 19. Photo-detectors 24 and 25 are suitably positioned along paths of the two beam parts. The photodetectors 24 and 25 are electrically connected to differential amplifier 26 which takes the difference of the two signals from the photodetectors and amplifies them. The polarity of the output signal will be dependent on which photodetector 24 or 25 receives the greater amount of light. For example, the differential amplifier may be wired so that if more light reaches photo-detector 24 (which would be the case when a sound wave impinges on the diaphragm 16 in the direction shown in FIGURE 1) the output signal will be negative.

Of course, when the membrane 16 is undisturbed, the fringe will be divided evenly, the amount of light intercepted by each photodetector 24 and 25 will be the same and the output from the differential amplifier will be zero.

The output signal from the differential amplifier 26 is electrically connected to the membrane supporting ring 17. A pair of electrically conductive force balancing grids or wires 27 and 28 are located on either side of the membrane 16. The wires 27 and 28 may, for example, be nickel approximately 0.07 mm. in diameter. The wires are spaced approximately 1 mm. from the membrane 16. Wire 27 is connected to a voltage source 29 and wire 28 is connected to a voltage source 31. The two voltage sources 29 and 31 are large relative to the output signal from the differential amplifier and equal in size. They may, for example, be 1500 volts. However, they are connected to the grids 27 and 28 so as to apply voltages of opposite polarity to the grids. Using the example described above, voltage source 29 is connected to grid 27 so as to apply a negative voltage thereto and voltage source 31 is connected to grid 28 so as to apply a positive voltage thereto. With a zero output from the differential amplifier 26, the charged grids 27 and 28 will have no effect on the membrane 16. However, a movement of the membrane 16 in the direction of grid 27 caused by an impinging sound wave will result in a negative output signal causing the membrane 16 to become negatively charged. However, the membrane will be repelled by grid 27 which is negatively charged and attracted by grid 28 which is positively charged. Accordingly, the membrane will be returned to its original null position.

This unique arrangement forms effectively a servo type force balancing system opposing any movement of the membrane 16 and increasing thereby the microphone's dynamic range.

In FIGURE 3 there is shown a modified version of the feedback servo system portion of the microphone. In this arrangement the outputs from the photodetectors are connected to a push-pull amplifier 41. The output from the push-pull amplifier 41 is connected to the force restoring grids 42 and 43. The electrically conductive ring 44 is connected to a suitable voltage source 45. In this arrangement the charges applied to the respective grids 42 and 43 counteract any movement of the electrically charged membrane 46.

Obviously, many modifications and variations of the present invention are possible in light of the above teachings. For example, the sensing prism 19, photodetectors 24 and 25, and differential amplifier 26 could be replaced by a junction photodiode and amplifier.

It is therefore to be understood that within the scope of the appended claims the invention may be practiced other than specifically described.

What is claimed is:

1. A microphone comprising:
a pressure sensitive diaphragm,
means operatively connected to said pressure sensitive diaphragm for producing a light pattern movable in response to movements of said pressure sensitive diaphragm, and
means for sensing movements of said light pattern and producing an electrical output whose polarity and magnitude are in accordance with the direction and relative movements of said light pattern.

2. The invention according to claim 1 and wherein said pressure sensitive diaphragm includes a thin film membrane approximately 1000 A. thick, whereby said diaphragm will respond to Brownian noise in the ultrasonic frequency range bandwidth.

3. The microphone according to claim 1 and further including means for applying said electrical output to said pressure sensitive diaphragm and electric field means positioned around said diaphragm member for creating an electric field in the direction of movement of said diaphragm of the same polarity as the electric output so as to oppose movements of said diaphragm.

4. A microphone comprising:
a reflective coated pressure sensitive diaphragm,
a beam splitting mirror positioned relative to said diaphragm member so as to form a resonant cavity,
means for directing a beam of light into said resonant cavity so as to cause said beam of light to be subjected to multiple reflections and produce an interference fringe pattern, and
means for sensing movements of said fringe pattern and converting said movements into an electrical signal output.

5. A microphone comprising:
an electrically conductive diaphragm,
means for converting movements of said diaphragm into an electrical signal whose polarity is related to the direction of movement and applying said signal to said diaphragm, and
means for creating an electric field around said diaphragm whose polarity is such that it will repel movements of said diaphragm.

6. A microphone comprising:
a reflective coated diaphragm,
a beam splitting mirror positioned relative to said diaphragm so as to form a resonant cavity,
a light source for projecting a beam of light through said beam splitting mirror so as to cause said beam of light to be subjected to multiple reflections and emerge containing a pattern of interference fringes, and
means for sensing movements of said pattern of interference fringes and converting the same into an electrical signal output.

7. The invention according to claim 6 and wherein said light source comprises a laser.

8. The invention according to claim 7 and wherein said sensing means includes a sensing prism positioned so as to divide one of said interference fringes into a pair of equal beam parts, photosensitive means for measuring the intensity of each of said beam parts and converting the same into an electrical signal, and a differential amplifier connected to said photosensitive means for producing an output signal whose polarity and magnitude are indicative of the relative intensities of the two beam parts.

9. The invention according to claim 8 and further including a pair of grids having electrical charges of opposite polarity and equal magnitude positioned on either side of the diaphragm, and means for applying the electrical signal output from the differential amplifier to said diaphragm.

10. A microphone system comprising:
a pressure sensitive, reflective and conductive coated diaphragm,
a beam splitting mirror,
said diaphragm and said mirror being arranged so as to form an optical resonant cavity,
a laser for projecting into said cavity a beam of coherent light,
said beam of light being subjected to multiple reflections within said cavity and emerging as a beam of light containing a pattern of interference fringes,
means for sensing changes in the position of one of said interference fringes caused by movements of the diaphragm and producing an electrical signal whose polarity and amplitude are proportional to the direction and extent of change in the position of the interference fringe and, hence, the direction and extent of movement of the diaphragm, said means including a beamsplitting prism positioned to divide the light from the interference fringe into two beam parts, a separate photodetector positioned along the path of each of said two beam parts for producing an electrical signal corresponding to the intensity of light in each of said two beam parts and a differential amplifier connected to the photodetectors for producing a single electrical signal corresponding to the difference in the two electrical signals from the photodetectors.
means connecting the output from the differential amplifier to the diaphragm, and
means for creating an electric field around said diaphragm whose polarity on one side of the diaphragm corresponds to the polarity of the signal supplied to the diaphragm when the diaphragm moves toward said side and whose polarity on the other side corresponds to the polarity of the signal when the diaphragm moves to the other side, in order to repel the movement of the diaphragm.

11. A microphone comprising:
a pressure sensitive diaphragm,
means operatively connected to said pressure sensitive diaphragm for producing a light pattern of interference fringes movable in response to movements of said pressure sensitive diaphragm, and
means for sensing movements of one of the interference fringes in said light pattern and producing an electrical output whose polarity and magnitude are in accordance with the direction and relative movements of said interference fringes.

References Cited

UNITED STATES PATENTS 2,259,511 10/1941 Banks _____ 179—138
2,403,915 7/1946 Evans _____ 350—269

ROBERT L. GRIFFIN, Primary Examiner.

ALBERT J. MAYER, Assistant Examiner.

U.S. Cl. X.R.
179—1; 350—269